United States Patent
Kikuchi et al.

(10) Patent No.: US 11,724,619 B2
(45) Date of Patent: Aug. 15, 2023

(54) VEHICLE

(71) Applicant: TOYOTA JIDOSHA KABUSHIKI KAISHA, Toyota (JP)

(72) Inventors: Yoshiaki Kikuchi, Toyota (JP); Junichi Matsumoto, Toyota (JP); Akio Uotani, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 245 days.

(21) Appl. No.: 17/039,013

(22) Filed: Sep. 30, 2020

(65) Prior Publication Data

US 2021/0188116 A1  Jun. 24, 2021

(30) Foreign Application Priority Data

Dec. 19, 2019  (JP) .................................. 2019-229539

(51) Int. Cl.
| | |
|---|---|
| *H01M 10/48* | (2006.01) |
| *B60L 50/64* | (2019.01) |
| *B60L 58/12* | (2019.01) |
| *B60K 1/04* | (2019.01) |
| *H02J 7/00* | (2006.01) |

(Continued)

(52) U.S. Cl.
CPC .............. *B60L 58/12* (2019.02); *B60K 1/04* (2013.01); *B60L 50/64* (2019.02); *H01M 10/486* (2013.01); *H02J 7/0047* (2013.01); *B60K 6/28* (2013.01); *B60K 2001/0405* (2013.01); *B60S 5/06* (2013.01); *B60Y 2200/91* (2013.01); *B60Y 2200/92* (2013.01); *H01M 2220/20* (2013.01)

(58) Field of Classification Search
CPC ........... B60L 58/12; B60L 50/64; B60K 1/04; B60K 6/28; B60K 2001/0405; H01M 10/486; H01M 2220/20; H02J 7/0047; B60S 5/06; B60Y 2200/91; B60Y 2200/92

See application file for complete search history.

(56) References Cited

U.S. PATENT DOCUMENTS

| | | | |
|---|---|---|---|
| 7,053,588 B2 * | 5/2006 | Nakanishi ............. | H02J 7/0048 320/104 |
| 10,615,467 B2 | 4/2020 | Ito et al. | |
| 2004/0027076 A1 | 2/2004 | Shimizu | |

(Continued)

FOREIGN PATENT DOCUMENTS

| | | |
|---|---|---|
| JP | 2002-186120 A | 6/2002 |
| JP | 2019-140775 A | 8/2019 |

(Continued)

OTHER PUBLICATIONS

2019229539,Decision_to_Grant_a_Patent_(Translated),Apr. 4, 2023 (Year: 2023).*
Jun. 23, 2022 Office Action issued in U.S. Appl. No. 17/062,723.

*Primary Examiner* — Alexander Usyatinsky
(74) *Attorney, Agent, or Firm* — Oliff PLC

(57) ABSTRACT

An electrically driven vehicle includes a battery pack including a battery ECU, a gate ECU provided separately from the battery pack, and an HVECU provided separately from the battery pack and the gate ECU and configured to control any one of battery power and battery current of the battery as a control target. The gate ECU is installed at a position outside the battery pack and relays communication between the battery ECU and the HVECU.

7 Claims, 6 Drawing Sheets

(51) Int. Cl.
*B60K 6/28* (2007.10)
*B60S 5/06* (2019.01)

(56) References Cited

U.S. PATENT DOCUMENTS

| | | | |
|---|---|---|---|
| 2006/0091857 A1* | 5/2006 | Nakanishi | B60L 58/15 |
| | | | 320/116 |
| 2007/0075686 A1* | 4/2007 | Togashi | B60L 58/12 |
| | | | 320/130 |
| 2010/0087976 A1* | 4/2010 | Aridome | B60W 20/10 |
| | | | 180/65.265 |
| 2010/0114762 A1 | 5/2010 | Ishii | |
| 2016/0221470 A1* | 8/2016 | Ito | B60W 20/13 |
| 2017/0233000 A1 | 8/2017 | Fujimoto et al. | |
| 2018/0110146 A1* | 4/2018 | Coles | B60R 16/0239 |
| 2018/0304763 A1 | 10/2018 | Moriya et al. | |
| 2019/0020075 A1 | 1/2019 | Ito et al. | |
| 2020/0361333 A1 | 11/2020 | Satoh | |

FOREIGN PATENT DOCUMENTS

| | | |
|---|---|---|
| JP | 6555714 B2 | 8/2019 |
| JP | 2019-156007 A | 9/2019 |
| WO | 2016/084160 A1 | 6/2016 |

\* cited by examiner

FRONT ← → REAR

VEHICLE

CROSS-REFERENCE TO RELATED APPLICATION

This application claims priority to Japanese Patent Application No. 2019-229539 filed on Dec. 19, 2019, incorporated herein by reference in its entirety.

BACKGROUND

1. Technical Field

The present disclosure relates to a vehicle having a replaceable battery pack mounted thereon.

2. Description of Related Art

Japanese Unexamined Patent Application Publication No. 2019-156007 (JP 2019-156007 A) discloses a control device that controls input power of a secondary battery mounted on a vehicle by using a power upper limit value (W) indicating an upper limit value of the input power of the secondary battery.

SUMMARY

Recently, an electrically driven vehicle (for example, an electric vehicle or a hybrid vehicle) that uses a secondary battery as a power source has become popular. In the electrically driven vehicle, when the capacity or performance of the secondary battery is reduced due to deterioration, or the like, of the battery, replacing the secondary battery mounted on the electrically driven vehicle can be considered.

A secondary battery is generally mounted on a vehicle in a form of a battery pack. The battery pack includes a secondary battery, a sensor that detects a state (for example, current, voltage, and temperature) of the secondary battery, and a control device. Hereinafter, the control device and the sensor included in the battery pack are sometimes referred to as a "battery ECU" and a "battery sensor", respectively. Peripheral devices (for example, a control device and a sensor) appropriate for the secondary battery are mounted on the battery pack. The battery pack is maintained such that the secondary battery and the peripheral devices thereof normally operate. For this reason, when the secondary battery mounted on the vehicle is replaced, it is considered desirable that the entire battery pack mounted on the vehicle as well as the secondary battery be replaced for the purpose of vehicle maintenance.

As described in JP 2019-156007 A, the control device which is mounted on the vehicle separately from a battery pack and controls input power of the secondary battery by using the power upper limit value is well-known. The control device is configured to execute a power-based input limitation. The power-based input limitation is a process for controlling the input power of the secondary battery such that the input power of the secondary battery does not exceed the power upper limit value. Generally, on a vehicle that employs a control device executing the power-based input limitation, a battery pack including a battery ECU which obtains the power upper limit value using a detection value of a battery sensor is mounted.

When such a battery pack is replaced, a configuration may be considered in which a control device that relays communication is provided separately for enabling communication between the replacement battery pack and a control device of the vehicle after the replacement. In a vehicle having such a configuration, in a case where prescribed information exchanged during communication is stored in a separately provided control device, for example, when a defect, such as the temperature of the secondary battery rising higher than expected, occurs, the separately provided control device needs to be installed such that the control device is not influenced by heat generated in the battery pack.

The present disclosure provides a vehicle having a replaceable battery pack mounted thereon, in which a control device that relays communication between the battery pack and a control device of the vehicle is installed at an appropriate position.

A vehicle according to one aspect of the present disclosure includes a battery pack including a secondary battery, a first battery sensor configured to detect a state of the secondary battery, and a first electronic control device, a second electronic control device including a storage device that stores prescribed information acquired from the battery pack, and a third electronic control device provided separately from the battery pack and the second electronic control device and configured to control any one of battery power and battery current of the secondary battery as a control target. The second electronic control device is installed at a position outside the battery pack. The second electronic control device is configured to relay communication between the first electronic control device and the third electronic control device.

In such a manner, since the second electronic control device is installed at a position outside the battery pack, it is possible to prevent the second electronic control device from being influenced by the heat generated when a defect occurs in the battery pack. Therefore, it is possible to protect a storage device that stores the prescribed information acquired from the battery pack in which a defect has occurred.

In the above aspect, the second electronic control device may be installed at a position not immediately above the battery pack in the vehicle.

The influence of the heat generated when a defect occurs in the battery pack is greater at a position immediately above the battery pack in the vehicle than at the position not immediately above the battery pack. Therefore, by providing the second electronic control device at the position not immediately above the battery pack, it is possible to prevent the second electronic control device from being influenced by the heat generated when a defect occurs in the battery pack.

In the above aspect, the battery pack may be installed outside a cabin of the vehicle. The second electronic control device may be installed inside the cabin of the vehicle.

In such a manner, since the heat generated when a defect occurs in the battery pack outside the cabin of the vehicle is less likely to be transferred by the cabin of the vehicle, it is possible to prevent the second electronic control device from being influenced by the heat generated when a defect occurs in the battery pack.

In the above aspect, the second electronic control device may be installed in a state of being covered with a thermal insulation material.

In such a manner, since the heat generated when a defect occurs in the battery pack is less likely to be transferred by the thermal insulation material, it is possible to prevent the second electronic control device from being influenced by the heat generated when a defect occurs in the battery pack.

In the above aspect, the second electronic control device may store, in the storage device, history information on information exchanged between the first electronic control device and the third electronic control device.

In such a manner, the storage device of the second electronic control device that relays communication between the first electronic control device and the third electronic control device stores the history information on the information exchanged between the first electronic control device and the third electronic control device. Therefore, when any defect related to the control of the battery power occurs during use of the battery pack, it is possible to easily separate a cause of the defect in the battery pack from a cause of the defect in the vehicle using the stored history information.

In the above aspect, the second electronic control device may store, in the storage device, the history information in a latest predetermined period.

In such a manner, it is possible to store the history information in the storage device without unnecessarily increasing a storage capacity of the storage device.

In the above aspect, the first electronic control device may calculate a first limit value for the other one of the battery power and the battery current, using a detection value of the first battery sensor. The second electronic control device may convert the first limit value calculated by the first electronic control device into a second limit value corresponding to the control target. The third electronic control device may control the control target, using the second limit value.

In such a manner, the first limit value calculated by the first electronic control device is converted into the second limit value by the second electronic control device, such that the third electronic control device controls any one of the battery power and the battery current of the secondary battery as a control target without changing a configuration of the third electronic control device.

With the foregoing aspect of the present disclosure, it is possible to provide a vehicle having a replaceable battery pack mounted thereon, in which a control device that relays communication between the battery pack and a control device of the vehicle is installed at an appropriate position.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
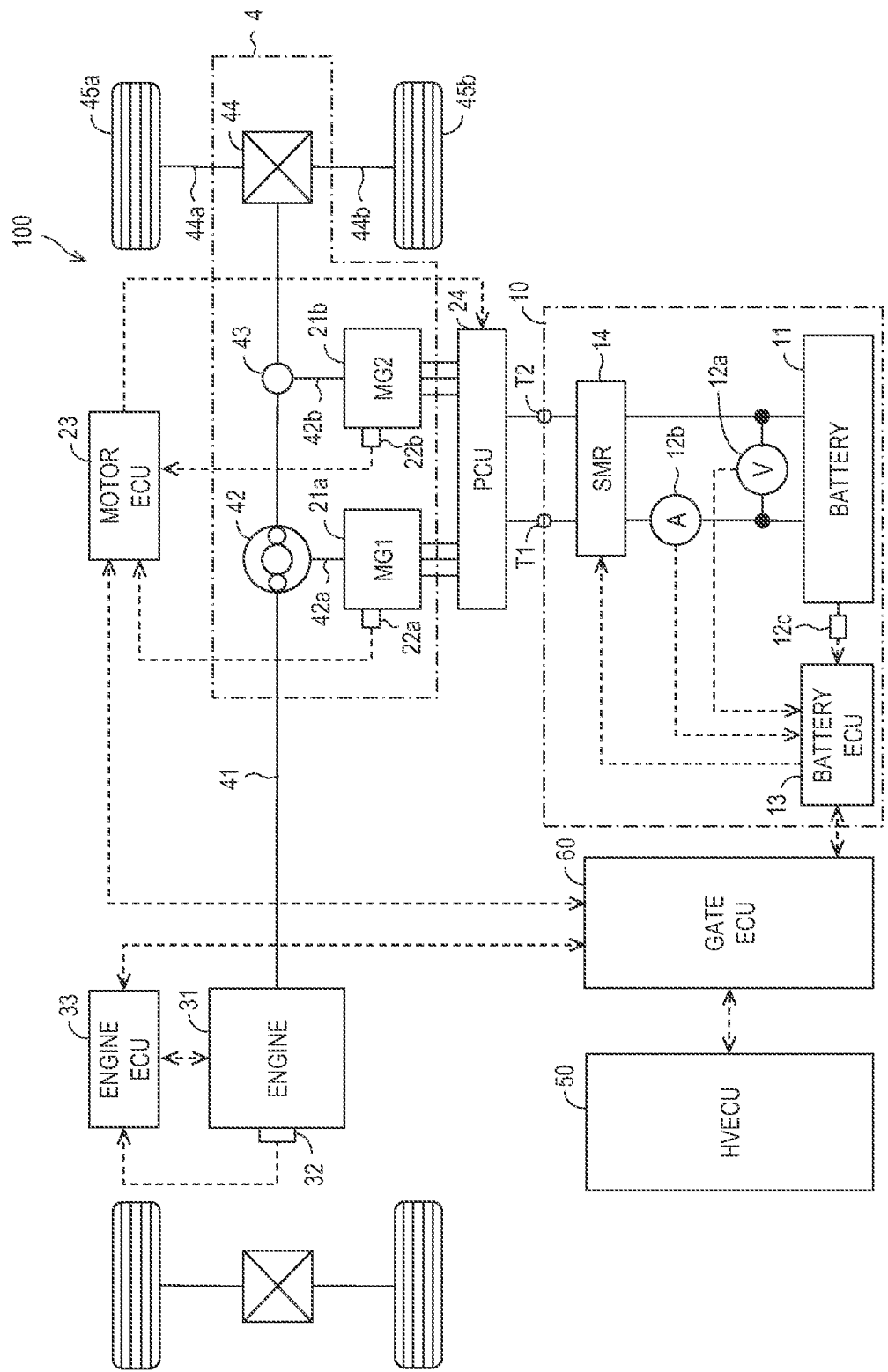
FIG. 1 is a diagram illustrating a configuration of an electrically driven vehicle according to an embodiment of the present disclosure.

Embodiments of the present disclosure will be described in detail with reference to the drawings. In the drawings, the same or corresponding parts will be denoted by the like signs, and description thereof will not be repeated. Hereinbelow, an electronic control unit is also referred to as an "ECU".

FIG. 1 is a diagram illustrating a configuration of an electrically driven vehicle (hereinafter, referred to as a "vehicle") 100 according to an embodiment of the present disclosure. In the present embodiment, it is assumed that the vehicle 100 is a front-wheel drive four-wheel vehicle (more specifically, a hybrid vehicle), but the number of wheels and a drive method can be appropriately changed. For example, the drive method may be rear-wheel drive or four-wheel drive.

Referring to FIG. 1, a battery pack 10 including a battery ECU 13 is mounted on the vehicle 100. Further, separate from the battery pack 10, a motor ECU 23, an engine ECU 33, an HVECU 50, and a gate ECU 60 are mounted on the vehicle 100. In the present embodiment, the battery ECU 13, the gate ECU 60, and the HVECU 50 respectively correspond to examples of a "first control device", a "second control device", and a "third control device", according to the present disclosure.

The battery pack 10 includes a battery 11, a voltage sensor 12a, a current sensor 12b, a temperature sensor 12c, a battery ECU 13, and a system main relay (SMR) 14. The battery 11 functions as a secondary battery. In the present embodiment, an assembled battery including a plurality of electrically connected lithium-ion batteries is employed as the battery 11. Each secondary battery that composes the assembled battery is also referred to as a "cell". In the present embodiment, each lithium-ion battery that composes the battery 11 corresponds to the "cell". Moreover, the secondary battery included in the battery pack 10 is not limited to the lithium-ion battery, and may be a different type of secondary battery (for example, a nickel-hydrogen battery). An electrolytic solution type of secondary battery or an all-solid-state type of secondary battery may be employed as the secondary battery.

The voltage sensor 12a detects voltage of each cell of the battery 11. The current sensor 12b detects current flowing through the battery 11 (the charging side is negative). The temperature sensor 12c detects the temperature of each cell of the battery 11. Each sensor outputs the detection result to the battery ECU 13. The current sensor 12b is provided on a current path of the battery 11. In the present embodiment, one voltage sensor 12a and one temperature sensor 12c are provided in each cell. However, an applicable embodiment of the present disclosure is not limited thereto, and one voltage sensor 12a and one temperature sensor 12c may be provided for each of a plurality of cells, or for one assembled battery. Hereinafter, the voltage sensor 12a, the current sensor 12b, and the temperature sensor 12c are collectively referred to as a "battery sensor 12". The battery sensor 12 may be a battery management system (BMS) that further has, in addition to the above sensor functions, a state of charge (SOC) estimation function, a state of health (SOH) estimation function, a cell voltage equalization function, a diagnosis function, and a communication function.

The SMR 14 is configured to switch between connection and disconnection of a power path that connects external connection terminals T1, T2 of the battery pack 10 to the battery 11. As the SMR 14, for example, an electromagnetic mechanical relay can be employed. In the present embodiment, a power control unit (PCU) 24 is connected to the external connection terminals T1, T2 of the battery pack 10. The battery 11 is connected to the PCU 24 via the SMR 14. When the SMR 14 is in a closed state (a connection state), power can be exchanged between the battery 11 and the PCU 24. On the other hand, when the SMR 14 is in an open state (a disconnection state), a power path that connects the battery 11 to the PCU 24 is disconnected. In the present embodiment, the SMR 14 is controlled by the battery ECU 13. The battery ECU 13 controls the SMR 14 according to an instruction from the HVECU 50. The SMR 14 is in the closed state (the connection state) during, for example, traveling of the vehicle 100.

The vehicle 100 includes, as power sources used for traveling, an engine 31, a first motor generator 21a (hereinafter, referred to as an "MG 21a"), and a second motor generator 21b (hereinafter, referred to as an "MG 21b"). Each of the MGs 21a, 21b is a motor generator functioning both as a motor that outputs torque using supplied drive power and as a generator that generates power using supplied torque. An alternating current motor (for example, a permanent magnet synchronous motor or an induction motor) is used as each of the MGs 21a, 21b. Each of the MGs 21a, 21b is electrically connected to the battery 11 via the PCU 24. The MGs 21a, 21b have rotor shafts 42a, 42b, respectively. The rotor shafts 42a, 42b correspond to rotation shafts of the MGs 21a, 21b, respectively.

The vehicle 100 further includes a single-pinion type of planetary gear 42. Each of an output shaft 41 of the engine 31 and the rotor shaft 42a of the MG 21a is connected to the planetary gear 42. The engine 31 may be, for example, a spark-ignition type of internal combustion engine including a plurality of cylinders (for example, four cylinders). The engine 31 generates power by burning fuel in each cylinder, and rotates a crankshaft (not shown) common to all the cylinders, using the generated power. The crankshaft of the engine 31 is connected to the output shaft 41 via a torsional damper (not shown). The output shaft 41 rotates by the rotation of the crankshaft.

The planetary gear 42 has three rotation elements, that is, an input element, an output element, and a reaction element. More specifically, the planetary gear 42 includes a sun gear, a ring gear that is arranged coaxially with the sun gear, a pinion gear that meshes with the sun gear and the ring gear, and a carrier that rotatably and revolvably holds the pinion gear. The carrier corresponds to the input element, the ring gear corresponds to the output element, and the sun gear corresponds to the reaction element.

Each of the engine 31 and the MG 21a is mechanically connected to drive wheels 45a, 45b via the planetary gear 42. The output shaft 41 of the engine 31 is connected to the carrier of the planetary gear 42. The rotor shaft 42a of the MG 21a is connected to the sun gear of the planetary gear 42. Torque output from the engine 31 is input to the carrier. The planetary gear 42 is configured to divide the torque output from the engine 31 to the output shaft 41 into two parts, and deliver the two parts to the sun gear (further, to the MG 21a) and to the ring gear, respectively. When the torque output from the engine 31 is output to the ring gear, reaction torque caused by the MG 21a acts on the sun gear.

The planetary gear 42 and the MG 21b are configured such that power output from the planetary gear 42 and power output from the MG 21b are combined and delivered to the drive wheels 45a, 45b. More specifically, an output gear (not shown) that meshes with a driven gear 43 is attached to the ring gear of the planetary gear 42. In addition, a drive gear (not shown) attached to the rotor shaft 42b of the MG 21b also meshes with the driven gear 43. The driven gear 43 acts to combine torque output from the MG 21b to the rotor shaft 42b and torque output from the ring gear of the planetary gear 42. The driving torque combined in the above manner is delivered to a differential gear 44, and further delivered to the drive wheels 45a, 45b via drive shafts 44a, 44b extending from the differential gear 44 to the right and left sides. The transmission 4 is composed of MGs 21a, 21b, the planetary gear 42, the rotor shafts 42a, 42b, the driven gear 43, and the differential gear 44 that are described above.

The MGs 21a, 21b are provided with motor sensors 22a, 22b, respectively, which detect states (for example, current, voltage, temperature, and rotation speed) of the MGs 21a, 21b. Each of the motor sensors 22a, 22b outputs the detection result to the motor ECU 23. The engine 31 is provided with an engine sensor 32 which detects a state (for example, an intake air amount, an intake pressure, an intake temperature, an exhaust pressure, an exhaust temperature, a catalyst temperature, an engine coolant temperature, and rotation speed) of the engine 31. The engine sensor 32 outputs the detection result to the engine ECU 33.

The HVECU 50 is configured to output, to the engine ECU 33, a command (a control command) for controlling the engine 31. The engine ECU 33 is configured to control various actuators (for example, a throttle valve, an ignition device, and an injector (neither shown)) of the engine 31 according to the command from the HVECU 50. The HVECU 50 can execute engine control via the engine ECU 33.

The HVECU 50 is configured to output, to the motor ECU 23, a command (a control command) for controlling each of the MGs 21a, 21b. The motor ECU 23 is configured to generate a current signal (for example, a signal indicating the magnitude and frequency of the current) corresponding to target torque of each of the MGs 21a, 21b according to the command from the HVECU 50, and output the generated current signal to the PCU 24. The HVECU 50 can execute motor control via the motor ECU 23.

The PCU 24 includes, for example, two inverters provided corresponding to the MGs 21a, 21b, and converters arranged between each inverter and the battery 11. The PCU 24 is configured to supply power accumulated in the battery 11 to each of the MGs 21a, 21b, and supply power generated by each of the MGs 21a, 21b to the battery 11. The PCU 24 is configured to separately control states of the MGs 21a, 21b. For example, the PCU 24 can set the MG 21b to a powering state while setting the MG 21a to a regenerative state (that is, a power generation state). The PCU 24 is configured to supply power generated by one of the MGs 21a, 21b to the other. In other words, the MG 21a and the MG 21b are configured to exchange power between each other.

The vehicle 100 is configured to execute hybrid vehicle (HV) traveling and electric vehicle (EV) traveling. The HV traveling is executed by the engine 31 and the MG 21b while the engine 31 generates a traveling driving force. The EV traveling is executed by the MG 21b while the engine 31 is stopped. When the engine 31 is stopped, combustion in each cylinder is stopped. When the combustion in each cylinder is stopped, the engine 31 does not generate combustion energy (further, a traveling driving force of the vehicle). The HVECU 50 is configured to switch between the EV traveling and the HV traveling depending on the situation.

Figure 2:
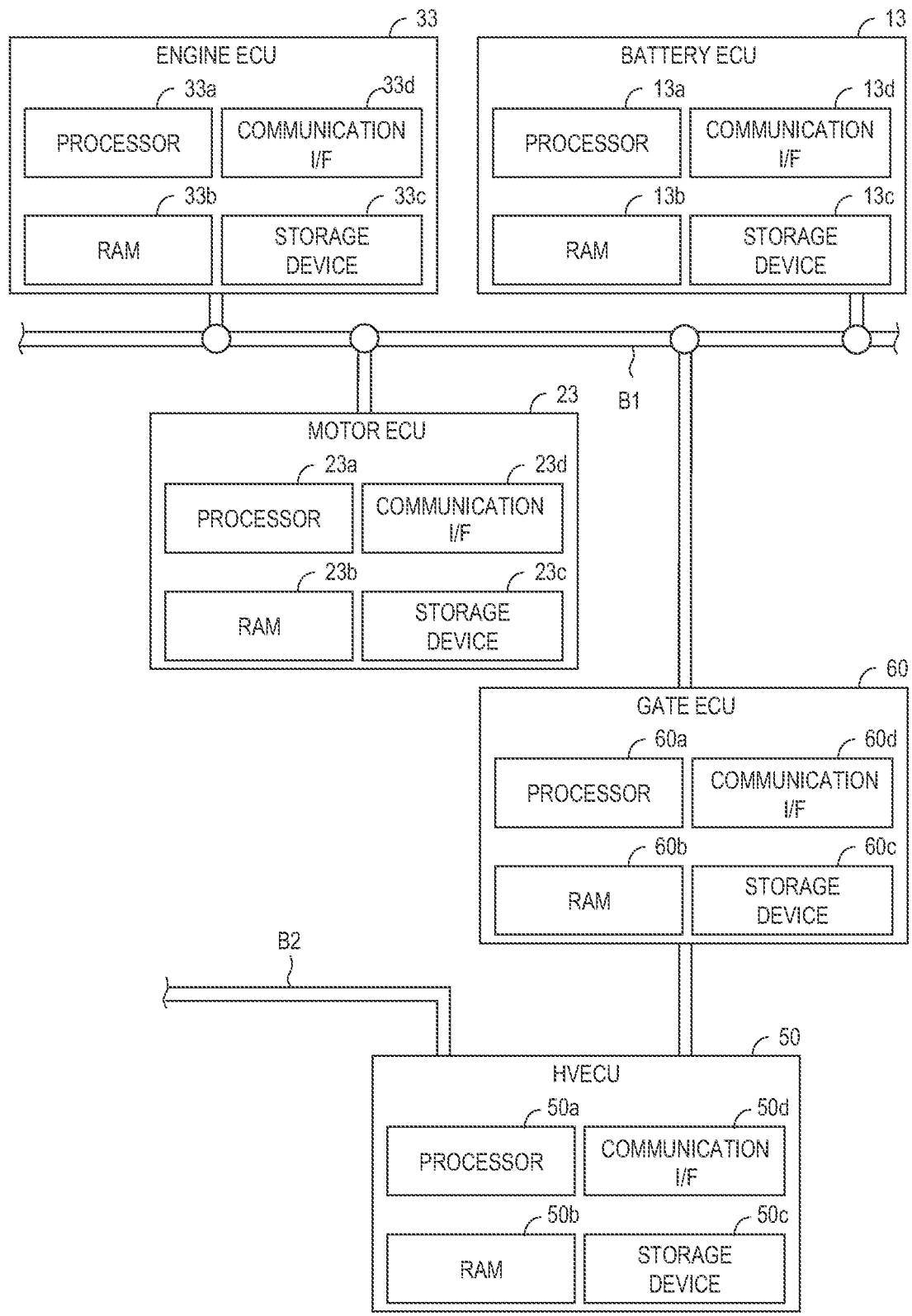
FIG. 2 is a diagram illustrating a connection state of each control device included in the vehicle according to the embodiment of the present disclosure.

FIG. 2 is a diagram illustrating a connection state of each control device included in the vehicle 100 according to the embodiment of the present disclosure. Referring to FIG. 2, the vehicle 100 includes a local bus B1 and a global bus B2. Each of the local bus B1 and the global bus B2 may be, for example, a controller area network (CAN) bus.

The battery ECU 13, the motor ECU 23, and the engine ECU 33 are connected to the local bus B1. Although not shown in FIG. 2, for example, a human-machine interface (HMI) control device is connected to the global bus B2. Examples of the HMI control device include a control device that controls a navigation system or a meter panel. In addition, the global bus B2 is connected to another global bus via a central gateway (CGW, not shown).

The HVECU 50 is connected to the global bus B2. The HVECU 50 is configured to execute CAN communication with each control device connected to the global bus B2. Further, the HVECU 50 is connected to the local bus B1 via the gate ECU 60. The gate ECU 60 is configured to relay communication between the HVECU 50 and each control device (for example, the battery ECU 13, the motor ECU 23, and the engine ECU 33) connected to the local bus B1. The HVECU 50 is configured to execute the CAN communication with each control device connected to the local bus B1 via the gate ECU 60. As described above, in the present embodiment, a vehicle control system is composed of each control device connected to the local bus B1.

In the present embodiment, a microcomputer is employed as each of the battery ECU 13, the motor ECU 23, the engine ECU 33, the HVECU 50, and the gate ECU 60. The battery ECU 13, the motor ECU 23, the engine ECU 33, the HVECU 50, and the gate ECU 60 include processors 13a, 23a, 33a, 50a, 60a, random access memories (RAM) 13b, 23b, 33b, 50b, 60b, storage devices 13c, 23c, 33c, 50c, 60c, and communication interfaces (I/Fs) 13d, 23d, 33d, 50d, 60d, respectively. For example, a central processing unit (CPU) can be employed as each processor. Each communication I/F includes a CAN controller. The RAM functions as a working memory that temporarily stores data processed by the processor. Each storage device is configured to store prescribed information. Each storage device includes, for example, a read-only memory (ROM) and a rewritable non-volatile memory (for example, an electrically erasable programmable read-only memory (EEPROM) and a data flash memory). In addition to a program, each storage device stores information (for example, maps, mathematical expressions, and various parameters) used in the program. When the processors respectively execute the programs stored in the storage devices, various controls of the vehicle are executed. However, an applicable embodiment of the present disclosure is not limited thereto, and the various controls may be executed by dedicated hardware (an electronic circuit). The number of processors included in each ECU is also optional, and any ECU may include a plurality of processors.

Returning to FIG. 1, charging/discharging control of the battery 11 will be described. Hereinafter, input power of the battery 11 and output power of the battery 11 are collectively referred to as "battery power". The HVECU 50 determines target battery power using the SOC of the battery 11. Then, the HVECU 50 controls the charging/discharging of the battery 11 such that the battery power is close to the target battery power. However, such charging/discharging control of the battery 11 is restricted by input and output limitations to be described below. Hereinafter, target battery power on the charging side (the input side) may be sometimes referred to as "target input power", and target battery power on the discharging side (the output side) may be sometimes referred to as "target output power". In the present embodiment, the power on the discharging side is represented by a positive sign (+) and the power on the charging side is represented by a negative sign (−). However, when comparing the magnitude of power, the absolute value is used regardless of the sign (+/−). In other words, power of which a value is closer to zero is smaller. When an upper limit value and a lower limit value for power are set, the upper limit value is positioned on the side where the absolute value of power is greater, and the lower limit value is positioned on the side where the absolute value of power is smaller. When power exceeds the upper limit value on the positive side, it means that the power becomes greater than the upper limit value on the positive side (that is, farther away from zero on the positive side). When power exceeds the upper limit value on the negative side, it means that the power becomes greater than the upper limit value on the negative side (that is, farther away from zero on the negative side). The SOC indicates a remaining charge amount and represents, for example, a ratio of a current charge amount to a charge amount in a fully charged state by 0% to 100%. As a method of measuring the SOC, a well-known method, such as a current integration method and an OCV estimation method, can be employed.

Figure 3:
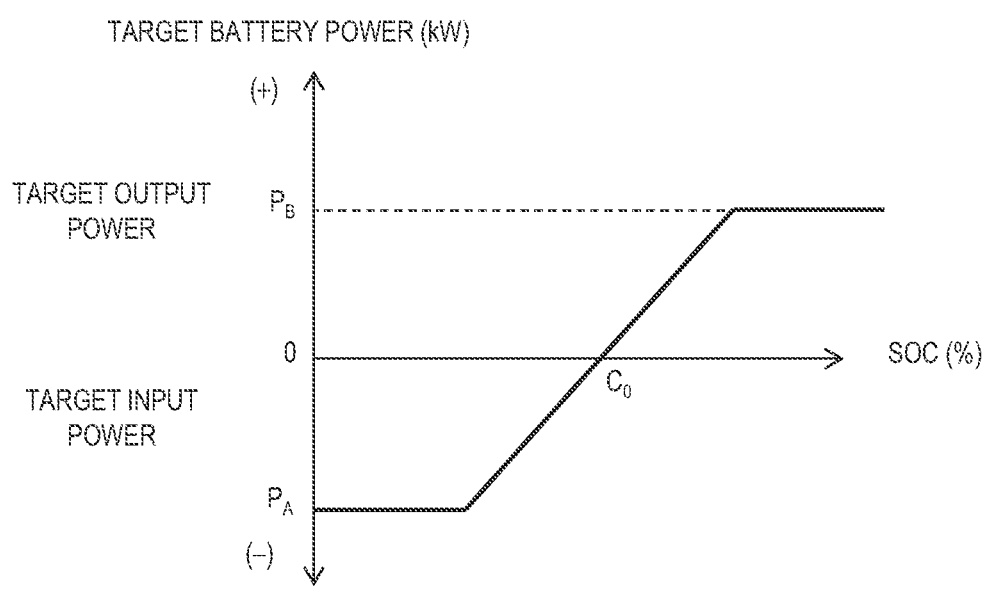
FIG. 3 is a diagram illustrating an example of a map used for determining target battery power.

FIG. 3 is a diagram illustrating an example of a map used for determining the target battery power. In FIG. 3, a reference value $C_0$ represents an SOC control center value, a power value $P_A$ represents an upper limit value of the target input power, and a power value $P_B$ represents an upper limit value of the target output power. By referring to a map illustrated in FIG. 3 together with FIG. 1, when the SOC of the battery 11 is the reference value $C_0$, the target battery power becomes zero and the charging/discharging of the battery 11 is not executed. In a region (a region of excessive discharging) where the SOC of the battery 11 is smaller than the reference value $C_0$, the target input power increases as the SOC of the battery 11 decreases until the target input power reaches the upper limit value (the power value $P_A$). On the other hand, in a region (a region of excessive charging) where the SOC of the battery 11 is greater than the reference value $C_0$, the target output power increases as the SOC of the battery 11 increases until the target output power reaches the upper limit value (the power value $P_B$). When the HVECU 50 determines the target battery power according to the map illustrated in FIG. 3 and executes the charging/discharging of the battery 11 such that the battery power becomes close to the determined target battery power, the SOC of the battery 11 can become close to the reference value $C_0$. The reference value $C_0$ of the SOC may be fixed or variable depending on the situation of the vehicle 100.

The HVECU 50 is configured to provide input and output limitations of the battery 11 using the battery ECU 13 and the gate ECU 60. The HVECU 50 sets the upper limit value $W_{in}$ of the input power of the battery 11 and the upper limit value $W_{out}$ of the output power of the battery 11, and controls the battery power such that the battery power does not exceed the set $W_{in}$ and $W_{out}$. The HVECU 50 adjusts the battery power by controlling the engine 31 and the PCU 24. When the $W_{in}$ or the $W_{out}$ is smaller than the target battery power (that is, close to zero), the battery power is controlled such that the battery power does not exceed the $W_{in}$ or the $W_{out}$, instead of the target battery power.

The battery ECU 13 is configured to set an upper limit value $IW_{in}$ of input current of the battery 11 using a detection value of the battery sensor 12. The battery ECU 13 is also configured to set an upper limit value $IW_{out}$ of output current of the battery 11 using the detection value of the battery sensor 12. Meanwhile, the HVECU 50 is configured to control the input power of the battery 11 using the $W_{in}$. The HVECU 50 is configured to execute a power-based input limitation (that is, a process for controlling the input power of the battery 11 such that the input power of the battery 11 does not exceed the $W_{in}$). Further, the HVECU 50 is configured to control the output power of the battery 11 using the $W_{out}$. The HVECU 50 is configured to execute a power-based output limitation (that is, a process for controlling the output power of the battery 11 such that the output power of the battery 11 does not exceed the $W_{out}$).

In such a manner, corresponding to the $IW_{in}$ and the $IW_{it}$ output from the battery pack 10, the $W_{in}$ and the $W_{out}$ used for controlling the battery power are obtained by the HVECU 50. For this reason, the gate ECU 60, interposed between the battery pack 10 and the HVECU 50, relays communication between the battery pack 10 and the HVECU 50, and converts the $IW_{in}$ and the $IW_{out}$ into the $W_{in}$ and the $W_{out}$, respectively. With such a configuration, the HVECU 50 can appropriately execute the power-based input and output limitations of the battery 11 included in the battery pack 10.

In the vehicle 100 having such a configuration, when the capacity or performance of the battery 11 is reduced due to deterioration, or the like, of the battery 11, replacing the battery 11 mounted on the vehicle 100 can be considered.

The battery 11 is mounted on the vehicle 100, generally in a form of the battery pack 10 as described above. Peripheral devices (for example, the battery sensor 12 and the battery ECU 13) appropriate for the battery 11 are mounted on the battery pack 10 as described above. The battery pack 10 is maintained such that the battery 11 and the peripheral devices thereof can normally operate. For this reason, when the battery 11 mounted on the vehicle 100 is replaced, it is considered desirable that the entire battery pack 10 mounted on the vehicle 100 as well as the battery 11 be replaced for the purpose of vehicle maintenance.

In the case where such a battery pack is replaced, the gate ECU 60 that relays communication as described above is separately provided so as to enable communication between the replacement battery pack 10 and the HVECU 50 after the replacement. In a vehicle having such a configuration, in a case where prescribed information exchanged during communication in the gate ECU 60 is stored in a storage device 60c, for example, when a defect, such as the temperature of the battery pack 10 rising higher than expected, occurs, the gate ECU 60 needs to be installed such that the ECU 60 is not influenced by the heat generated in the battery pack 10.

Therefore, in the present embodiment, it is assumed that the gate ECU 60 is installed at a position outside the battery pack 10. More specifically, it is assumed that the gate ECU 60 is installed at a position not immediately above the battery pack 10.

In such a manner, since the gate ECU 60 is installed at a position outside the battery pack 10, it is possible to prevent the gate ECU 60 from being influenced by the heat generated when a defect occurs in the battery pack 10. Therefore, it is possible to protect the storage device 60c that stores prescribed information acquired from the battery pack 10 in which a defect has occurred.

The motor ECU 23, the engine ECU 33, and the HVECU 50 are also installed at predetermined positions outside the battery pack 10. Further, the battery ECU 13 is installed at a predetermined position inside the battery pack 10.

Hereinafter, an example of a configuration of each of the battery ECU 13, the HVECU 50, and the gate ECU 60 in the present embodiment will be described, and an example of prescribed information stored in the gate ECU 60 and an example of a position at which the gate ECU 60 is installed will be described in detail.

Figure 4:
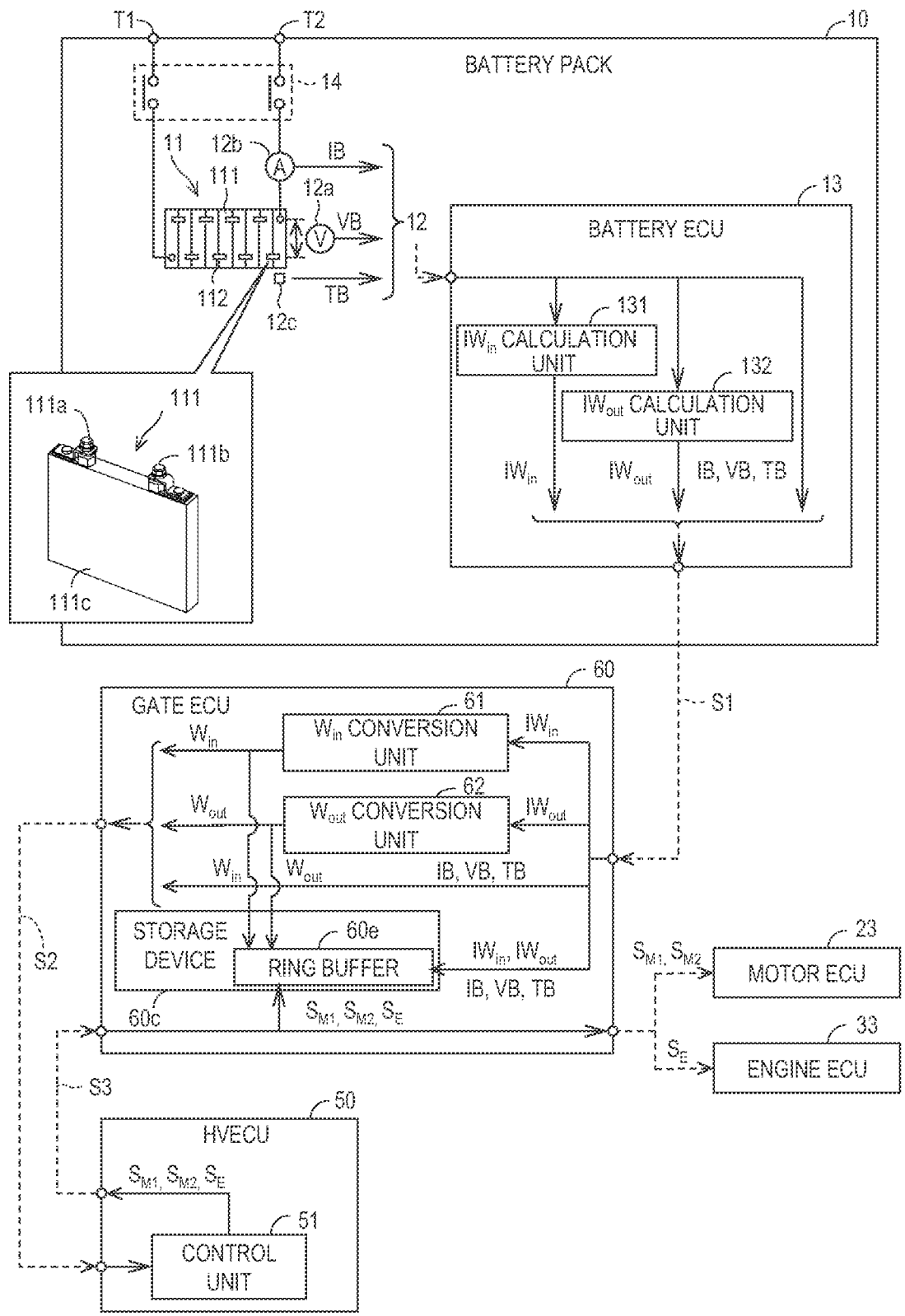
FIG. 4 is a diagram illustrating detailed configurations of a battery pack, an HVECU, and a gate ECU.

FIG. 4 is a diagram illustrating detailed configurations of the battery pack 10, the HVECU 50, and the gate ECU 60. By referring to FIG. 4 together with FIG. 2, in the present embodiment, the battery 11 included in the battery pack 10 is an assembled battery including a plurality of cells 111. Each cell 111 may be, for example, a lithium-ion battery. Each cell 111 includes a positive electrode terminal 111a, a negative electrode terminal 111b, and a battery case 111c. In the battery 11, the positive electrode terminal 111a of one cell 111 and the negative electrode terminal 111b of another adjacent cell 111 are electrically connected to each other by a conductive bus bar 112. The cells 111 are connected in series.

The battery pack 10 includes the battery sensor 12, the battery ECU 13, and the SMR 14 in addition to the battery 11. A signal (hereinafter, also referred to as a "battery sensor signal") output from the battery sensor 12 to the battery ECU 13 includes a signal indicating voltage VB output from the voltage sensor 12a, a signal indicating current IB output from the current sensor 12b, and a signal indicating the temperature TB output from the temperature sensor 12c. The voltage VB indicates an actually measured value of the voltage of each cell 111. The current IB indicates an actually measured value of the current flowing through the battery 11 (the charging side is negative). The temperature TB indicates an actually measured value of the temperature of each cell 111.

The battery ECU 13 repeatedly acquires a latest battery sensor signal. An interval (hereinafter, also referred to as a "sampling cycle") at which the battery ECU 13 acquires a battery sensor signal may be fixed or variable. In the present embodiment, the sampling cycle is assumed to be 8 milliseconds. However, an applicable embodiment of the present disclosure is not limited thereto, and the sampling cycle may be variable within a predetermined range (for example, a range from 1 millisecond to 1 second).

The battery ECU 13 includes an $IW_{in}$ calculation unit 131 and an $IW_{out}$ calculation unit 132. The $IW_{in}$ calculation unit 131 is configured to obtain the $IW_{in}$ using a detection value (that is, a battery sensor signal) of the battery sensor 12. A well-known method can be employed as an $IW_{in}$ calculation method. The $IW_{in}$ calculation unit 131 may determine the $IW_{in}$ such that a charge current limitation for protecting the battery 11 is executed. The $IW_{in}$ may be determined to prevent, for example, excessive charging, Li deposition, high rate deterioration, and overheating of the battery 11. The $IW_{out}$ calculation unit 132 is configured to obtain the $IW_{out}$ using a detection value (that is, a battery sensor signal) of the battery sensor 12. A well-known method can be employed as an $IW_{out}$ calculation method. The $IW_{out}$ calculation unit 132 may determine the $IW_{out}$ such that a discharge current limitation for protecting the battery 11 is executed. The $IW_{out}$ may be determined to prevent, for example, excessive discharging, Li deposition, high rate deterioration, and overheating of the battery 11. In the battery ECU 13, the $IW_{in}$ calculation unit 131 and the $IW_{out}$ calculation unit 132 are embodied by, for example, the processor 13a illustrated in FIG. 2 and the program executed by the processor 13a. However, an applicable embodiment of the present disclosure is not limited thereto, and each of these units may be embodied by dedicated hardware (an electronic circuit).

The battery pack 10 outputs, to the gate ECU 60 as a command signal S1, the $IW_{in}$ obtained by the $IW_{in}$ calculation unit 131, the $IW_{out}$ obtained by the $IW_{out}$ calculation unit 132, and the signal (that is, the battery sensor signal) input from the battery sensor 12. These pieces of information are output from the battery ECU 13 included in the battery pack 10 to the gate ECU 60 provided outside the battery pack 10. As illustrated in FIG. 2, the battery ECU 13 and the gate ECU 60 exchange information via the CAN communication.

The gate ECU 60 includes a $W_{in}$ conversion unit 61 and a $W_{out}$ conversion unit 62 to be described below. In the gate ECU 60, the $W_{in}$ conversion unit 61 and the $W_{out}$ conversion unit 62 are embodied by, for example, the processor 60a illustrated in FIG. 2 and the program executed by the processor 60a. However, an applicable embodiment of the present disclosure is not limited thereto, and each of these units may be embodied by dedicated hardware (an electronic circuit).

The $W_{in}$ conversion unit 61 converts the $IW_{in}$ into the $W_{in}$ using the following equation (1). The equation (1) is stored in advance in the storage device 60c (see FIG. 2):

$$W_{in} = IW_{in} \times VBs \tag{1}$$

In the equation (1), VBs represents an actually measured value of the voltage of the battery 11 detected by the battery sensor 12. In the present embodiment, the average cell voltage (for example, the average of the voltages of all the cells 111 composing the battery 11) is employed as the VBs. However, an applicable embodiment of the present disclosure is not limited thereto, and instead of the average cell voltage, the maximum cell voltage (that is, the highest voltage from among the voltages of all the cells 111) and the minimum cell voltage (that is, the lowest voltage from among the voltages of all the cells 111), or the inter-terminal voltage of the assembled battery (that is, the voltage applied between the external connection terminal T1 and the external connection terminal T2 when the SMR 14 is in the closed state) may be employed as the VBs. The $W_{in}$ conversion unit 61 can acquire the VBs using the battery sensor signal (in particular, the voltage VB). The $W_{in}$ conversion unit 61 converts the $IW_{in}$ into the $W_{in}$ by multiplying the $IW_{in}$ by the VBs according to the above equation (1).

The $W_{out}$ conversion unit 62 converts the $IW_{out}$ into the $W_{out}$ using the following equation (2). The VBs in the equation (2) is the same as that in the equation (1). The equation (2) is stored in advance in the storage device 60c (see FIG. 2):

$$W_{out} = IW_{out} \times VBs \tag{2}$$

The $W_{out}$ conversion unit 62 can acquire the VBs (that is, the actually measured value of the voltage of the battery 11 detected by the battery sensor 12) using the battery sensor signal (in particular, the voltage VB). The $W_{out}$ conversion unit 62 converts the $IW_{out}$ into the $W_{out}$ by multiplying the $IW_{out}$ by the VBs according to the above equation (2).

When the $IW_{in}$, the $IW_{out}$, and the battery sensor signal are input from the battery pack 10 to the gate ECU 60, the $W_{in}$ conversion unit 61 and the $W_{out}$ conversion unit 62 of the gate ECU 60 convert the $IW_{in}$ and the $IW_{out}$ into the $W_{in}$ and the $W_{out}$, respectively. Then, a command signal S2 including the $W_{in}$, the $W_{out}$, and the battery sensor signal is output from the gate ECU 60 to the HVECU 50. As illustrated in FIG. 2, the gate ECU 60 and the HVECU 50 exchange information via the CAN communication.

Further, a storage area (hereinafter, simply referred to as a "ring buffer") 60e that functions as a ring buffer is set in the storage device 60c. The storage device 60c is configured to keep at least the information stored in the ring buffer 60e even after the power supply of the vehicle 100 is disconnected. The ring buffer 60e stores information including various detection results, various calculation results, and various control commands exchanged between the battery ECU 13 and the HVECU 50. In other words, the ring buffer 60e stores the $IW_{in}$, $IW_{out}$, IB, VB, and TB that are input from the battery ECU 13, the $W_{in}$ that is a calculation result of the $W_{in}$ conversion unit 61, the $W_{out}$ that is a calculation result of the $W_{out}$ conversion unit 62, and control commands $S_{M1}$, $S_{M2}$, and $S_E$ to be described below.

The information exchanged between the battery ECU 13 and the HVECU 50 is repeatedly acquired and stored in the ring buffer 60e. When a predetermined period has elapsed since the information is acquired, it is overwritten by newly acquired information. For this reason, the ring buffer 60e stores information exchanged between the battery ECU 13 and the HVECU 50 in a latest predetermined period.

The HVECU 50 includes a control unit 51 to be described below. In the HVECU 50, the control unit 51 is embodied by, for example, the processor 50a illustrated in FIG. 2 and the program executed by the processor 50a. However, an applicable embodiment of the present disclosure is not limited thereto, and the control unit 51 may be embodied by dedicated hardware (an electronic circuit).

The control unit 51 is configured to control the input power of the battery 11 using the upper limit value $W_{in}$. Further, the control unit 51 is configured to control the output power of the battery 11 using the upper limit value $W_{out}$. In the present embodiment, the control unit 51 prepares the control commands $S_{M1}$, $S_{M2}$, and $S_E$ for the MGs 21a, 21b, and the engine 31, illustrated in FIG. 1, respectively such that the input power and output power of the battery 11 do not exceed the upper limit values $W_1$, $W_{out}$, respectively. The control unit 51 outputs, to the gate ECU 60, a command signal S3 including the control commands $S_{M1}$, $S_{M2}$ for the MGs 21a, 21b, and the control command $S_E$ for the engine 31. Then, the control commands $S_{M1}$, $S_{M2}$ in the command signal S3 output from the HVECU 50 are transmitted to the motor ECU 23 via the gate ECU 60. The motor ECU 23 controls the PCU 24 (see FIG. 1) according to the received control commands $S_{M1}$, $S_{M2}$. Further, the control command $S_E$ in the command signal S3 output from the HVECU 50 is transmitted to the engine ECU 33 via the gate ECU 60. The engine ECU 33 controls the engine 31 according to the received control command $S_E$. The MGs 21a, 21b, and the engine 31 are controlled according to the control commands $S_{M1}$, $S_{M2}$, and $S_E$, respectively, and thus the input power and output power of the battery 11 are controlled such that the input power and output power of the battery 11 do not exceed the upper limit values $W_{in}$, $W_{out}$, respectively. By controlling the engine 31 and the PCU 24, the HVECU 50 can adjust the input power and output power of the battery 11.

Hereinafter, in the present embodiment, an example of a position at which the gate ECU 60 is installed will be described with reference to FIGS. 5 to 7.

Figure 5:
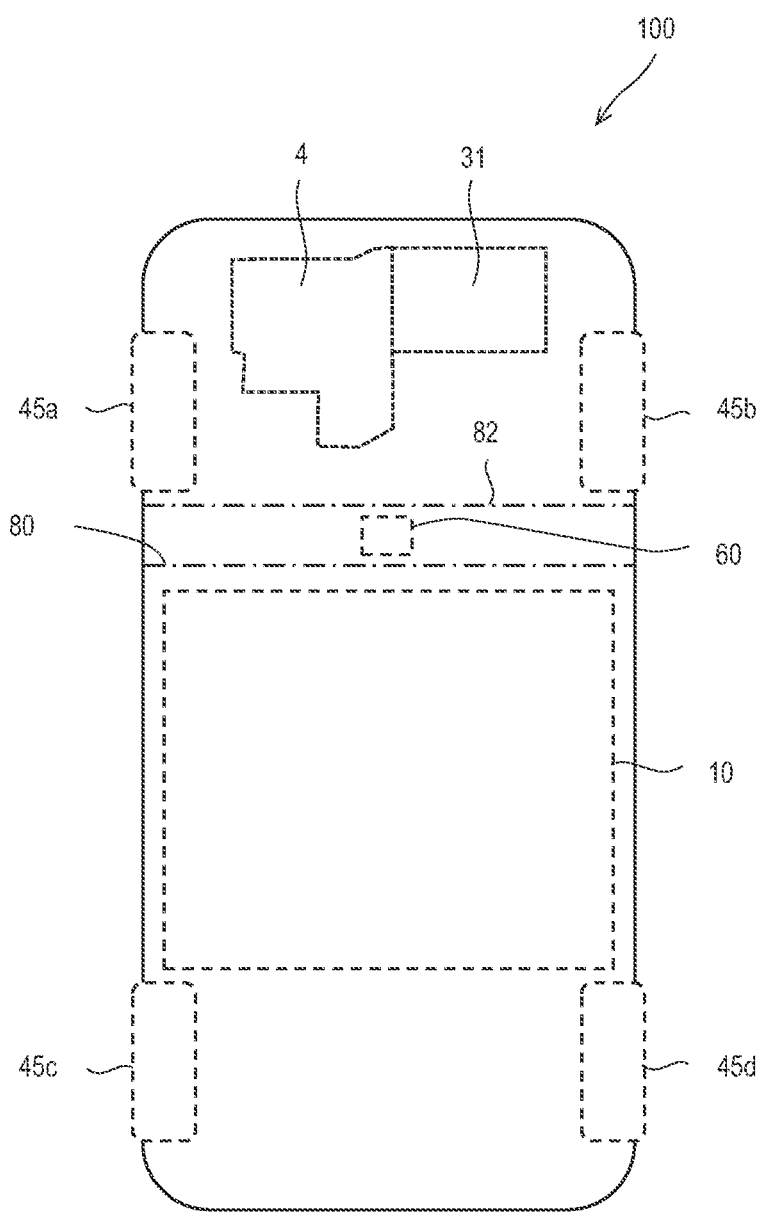
FIG. 5 is a diagram illustrating an example of a position of a gate ECU viewed from above the vehicle.
Figure 6:
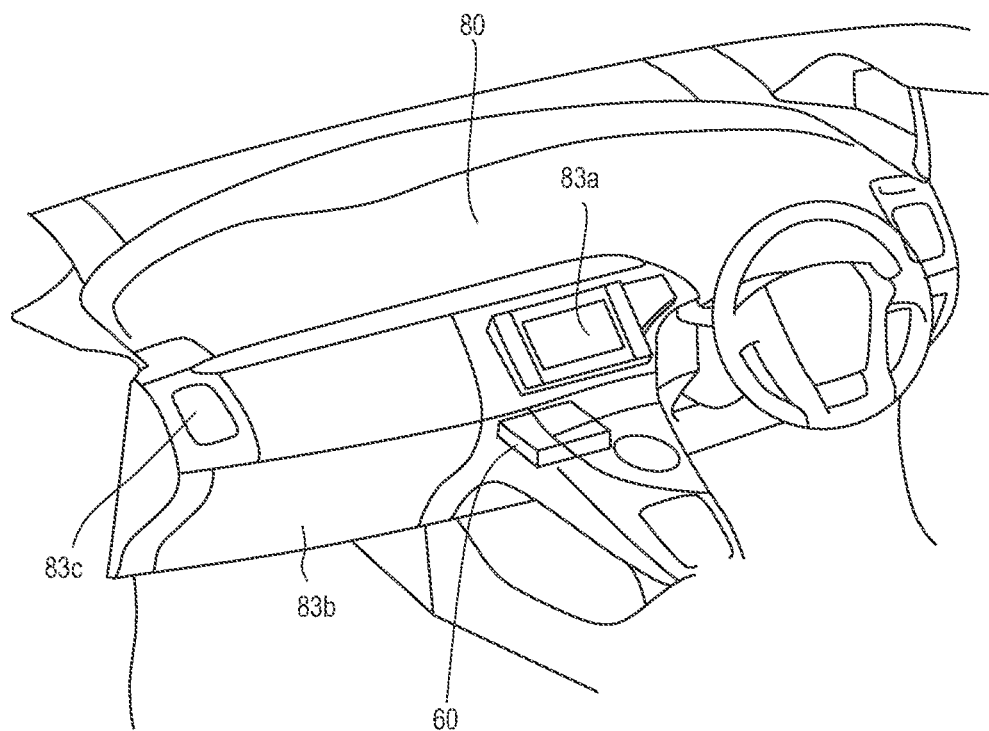
FIG. 6 is a diagram illustrating an example of a position of the gate ECU inside a cabin of the vehicle.

FIG. 5 is a diagram illustrating an example of a position of the gate ECU 60 viewed from above the vehicle 100. FIG. 6 is a diagram illustrating an example of a position of the gate ECU 60 inside a cabin of the vehicle 100. FIG. 7 is a diagram illustrating an example of a position of the gate ECU 60 viewed from a side of the vehicle 100.

As illustrated in FIG. 5, the gate ECU 60 is installed, for example, between a dashboard 80 and a dash panel 82 that serves as a boundary between an engine room, provided with the engine 31 and the transmission 4, and the vehicle cabin. As illustrated in FIG. 6, the dashboard 80 is provided with, for example, a display 83a of a navigation system, a glove box 83b, an air outlet 83c of an air conditioner, and the like. The battery pack 10 is provided between the drive wheels 45a, 45b that are front wheels, and driven wheels 45c, 45d that are rear wheels. As illustrated in FIG. 5, the gate ECU 60 is provided at a position inside the vehicle cabin which does not overlap the battery pack 10 viewed from above the vehicle 100.

Figure 7:
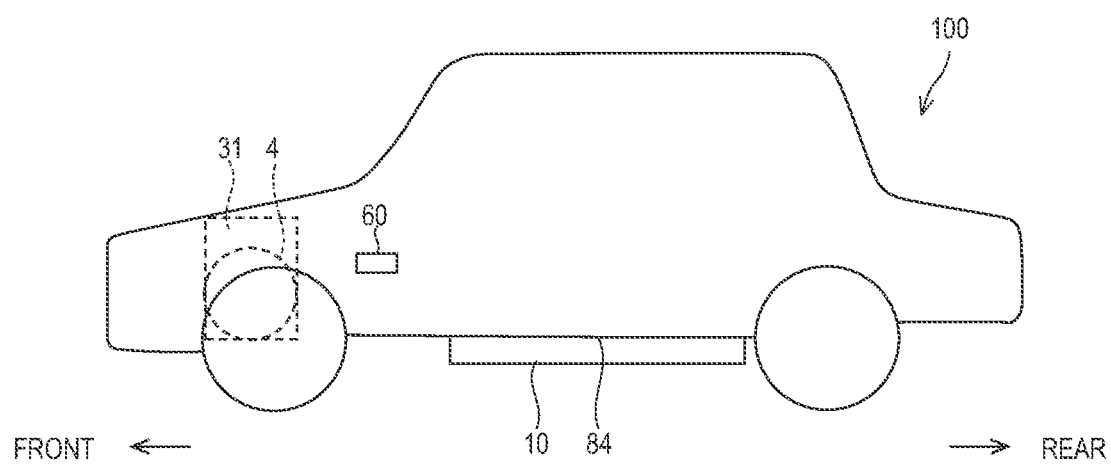
FIG. 7 is a diagram illustrating an example of a position of the gate ECU viewed from a side of the vehicle.

As illustrated in FIG. 7, the battery pack 10 is installed under the floor 84 of the vehicle 100. In other words, the battery pack 10 is provided at a position outside the vehicle cabin. Further, the gate ECU 60 is installed at a position not immediately above the battery pack 10.

As described above, the vehicle 100 according to the present embodiment includes the battery pack 10 including the battery ECU 13, and the HVECU 50 and the gate ECU 60 that are provided separately from the battery pack 10.

The battery ECU 13 is configured to obtain the $IW_{in}$ (that is, a current upper limit value indicating the upper limit value of the input current of the battery 11) and the $IW_{out}$ (that is, a current upper limit value indicating the upper limit value of the output current of the battery 11) using the detection value of the battery sensor 12. The battery pack 10 is configured to output the $IW_{in}$ and the $IW_{out}$.

The gate ECU 60 is configured to relay communication between the battery ECU 13 and the HVECU 50. The $W_{in}$ conversion unit 61, the $W_{out}$ conversion unit 62, and the storage device 60c including the ring buffer 60e are mounted on the gate ECU 60. When the $IW_{in}$ and the $IW_{out}$ are input from the battery pack 10 to the gate ECU 60, the $W_{in}$ conversion unit 61 and the $W_{out}$ conversion unit 62 of the gate ECU 60 convert the $IW_{in}$ and the $IW_{out}$ into the $W_{in}$ and the $W_{out}$, respectively. Then, the $W_{in}$ and the $W_{out}$ are output from the gate ECU 60 to the HVECU 50. Further, the gate ECU 60 stores, in the ring buffer 60e of the storage device 60c, the $IW_{in}$, $IW_{out}$, $W_{in}$, $W_{out}$, IB, VB, TB, $S_{M1}$, $S_{M2}$, and $S_E$. For this reason, the ring buffer 60e stores the history information on the above-described information in the latest predetermined period.

The HVECU 50 is configured to control the input power of the battery 11 using the upper limit value $W_{in}$ input from the gate ECU 60. Further, the HVECU 50 is configured to control the output power of the battery 11 using the upper limit value $W_{out}$ input from the gate ECU 60. For this reason, the HVECU 50 can appropriately execute the power-based input and output limitations using the upper limit values $W_{in}$, $W_{out}$.

As described above, since the storage device 60c of the gate ECU 60 stores the history information on the information exchanged between the battery ECU 13 and the HVECU 50, when any defect related to the control of the battery power occurs during the use of the replacement battery pack 10 after the replacement, it is possible to easily separate a cause of the defect in the battery pack 10 from a cause of the defect in the vehicle 100 excluding the battery pack 10, using the stored history information.

When the cause of various defects that have occurred in the vehicle is analyzed, the information exchanged between the battery ECU 13 and the HVECU 50 in the latest predetermined period is read out from the ring buffer 60e of the gate ECU 60. When the information received from the battery pack 10 includes some abnormal information (for example, when there is a value in the detection history of the temperature sensor exceeding a range that can be normally obtained), it can be determined that the cause of the defect is in the battery pack 10. On the other hand, when the information received from the battery pack 10 is normal and the information received from the HVECU 50 includes some abnormal information (for example, when a value indicating a control command to the MG 21a, the MG 21b or the engine 31 exceeds a range that can be normally obtained), it can be determined that the cause of the defect is in the HVECU 50. For this reason, it is possible to easily separate a cause of the defect in the battery pack 10 from a cause of the defect in the vehicle 100 excluding the battery pack 10.

Further, since the gate ECU 60 that stores the information with which the cause of such a defect can be easily separated is provided at a position outside the battery pack 10, it is possible to prevent the gate ECU 60 from being influenced by the heat generated when a defect occurs in the battery pack 10. Therefore, it is possible to protect the storage device 60c that stores the above prescribed information acquired from the battery pack in which a defect has occurred. In particular, the influence of the heat generated when a defect occurs in the battery pack 10 is greater at a position immediately above the battery pack 10 in the vehicle 100 than at a position not immediately above the battery pack 10. Therefore, by providing the gate ECU 60 at a position not immediately above the battery pack 10, it is possible to prevent the gate ECU 60 from being influenced by the heat generated when a defect occurs in the battery pack 10. Further, since the heat generated when a defect occurs in the battery pack 10 outside the vehicle cabin is less likely to be transferred by the vehicle cabin, it is possible to prevent the gate ECU 60 from being influenced by the heat generated when a defect occurs in the battery pack 10.

Therefore, it is possible to provide a vehicle having a replaceable battery pack mounted thereon, in which a control device that relays communication between the battery pack and a control device of the vehicle is installed at an appropriate position.

In addition, since the ring buffer 60e stores the history information in the latest predetermined period, it is possible to store the history information without unnecessarily increasing a storage capacity of the storage device 60c.

Further, when the battery current limit values $IW_{in}$, $IW_{out}$ calculated in the battery ECU 13 differ from the limit values of the control target in the HVECU 50, the gate ECU 60 converts the $IW_{in}$ and the $IW_{out}$ into the $W_{in}$ and the $W_{out}$, respectively. Therefore, it is possible to control the battery power of the battery pack 10 using the information from the battery pack 10 without changing a configuration of the HVECU 50.

Hereinafter, a modified example will be described. In the above-described embodiment, although an example in which the battery ECU 13, the motor ECU 23, and the engine ECU 33 are connected to the local bus B1 has been described, the motor ECU 23 and the engine ECU 33 may be connected to the global bus B2.

Further, in the above-described embodiment, as a configuration of the electrically driven vehicle, although an example of a configuration of a hybrid vehicle as illustrated in FIG. 1 has been described, an applicable embodiment of the present disclosure is not particularly limited thereto. The electrically driven vehicle may be, for example, an electric vehicle on which an engine is not mounted, or a plug-in hybrid vehicle (PHV) in which a secondary battery of a battery pack is charged using power supplied from the outside of the vehicle.

Moreover, in the above-described embodiment, although an example in which the HVECU 50 is configured to control the SMR 14 via the battery ECU 13 has been described, the HVECU 50 may be configured to directly control the SMR 14, not via the battery ECU 13.

In addition, in the above-described embodiment, although an example in which the battery 11 (the secondary battery) included in the battery pack 10 is an assembled battery has been described, the battery 11 may be, for example, a single battery.

Further, in the above-described embodiment, although the gate ECU 60 storing, in the ring buffer 60e of the storage device 60c, the $IW_{in}$, $IW_{out}$, $W_m$, $W_{out}$, IB, VB, TB, $S_{M1}$, $S_{M2}$, and $S_E$ as information exchanged between the battery ECU 13 and the HVECU 50 has been described, the gate ECU 60 may store, in the ring buffer 60e of the storage device 60c, for example, at least one piece of information, from among the above pieces of information, using which it is possible to separate causes of defects assumed in advance.

Furthermore, in the above-described embodiment, although the gate ECU 60 storing the information exchanged between the battery ECU 13 and the HVECU 50 in the ring buffer 60e of the storage device 60c has been described, the gate ECU 60 may store, in the ring buffer 60e of the storage device 60c, at least one of the information exchanged between the motor ECU 23 and the HVECU 50, and the information exchanged between the engine ECU 33 and the HVECU 50, in addition to the above-described information. As such, it is possible to easily identify a part in which a defect has occurred.

In addition, in the above-described embodiment, although the gate ECU 60 storing the information exchanged between the battery ECU 13 and the HVECU 50 in the ring buffer 60e of the storage device 60c has been described, an interval at which the gate ECU 60 stores the information may be the same as, or longer than, an interval at which the gate ECU 60 acquires the information. As such, it is possible to set the interval at which the gate ECU 60 stores the information according to speed at which the information can be written on the storage device 60c. For this reason, it is possible to broaden the types of memories that can be selected as the ring buffer 60e. Further, for example, by setting the interval at which the information is stored to be longer than the interval at which the information is acquired, it is possible to store history information in a predetermined period without unnecessarily increasing the storage capacity.

Moreover, in the above-described embodiment, although the HVECU 50 executing the power-based input and output limitations has been described, the HVECU 50 may execute, for example, current-based input and output limitations. In this case, the $W_{in}$ conversion unit 61 and the $W_{out}$ conversion unit 62 of the gate ECU 60 are omitted.

In addition, in the above-described embodiment, although the battery ECU 13 calculating the upper limit values $IW_{in}$, $IW_{out}$ of the battery current has been described, the battery ECU 13 may calculate, for example, the upper limit values $W_{in}$, $W_{out}$, of the battery power. In this case, the $W_{in}$ conversion unit 61 and the $W_{out}$ conversion unit 62 of the gate ECU 60 are omitted.

Furthermore, in the above-described embodiment, an example in which the gate ECU 60 is installed between the dash panel 82 and the dashboard 80 has been described, but an applicable embodiment of the present disclosure is not limited thereto, and the gate ECU 60 may be installed inside the vehicle 100 and at least outside the battery pack 10. For example, the gate ECU 60 may be installed in a trunk on the rear side of the vehicle 100, or installed on an inner side of an exterior of the vehicle 100, such as the roof and a pillar. Alternatively, for example, when the battery pack 10 is installed under the trunk on the rear side of vehicle 100, the gate ECU 60 may be installed under a seat, in the center of the vehicle 100, or the like. As such, it is possible to avoid damage to the gate ECU 60 caused by an accident, or the like.

Moreover, in the above-described embodiment, an example in which the gate ECU 60 is installed between the dash panel 82 and the dashboard 80 has been described. However, for example, the gate ECU 60 may be installed in a state of being covered with a thermal insulation material. As such, since the heat generated when a defect occurs in the battery pack 10 is less likely to be transferred by the thermal insulation material, it is possible to prevent the gate ECU 60 from being influenced by the heat generated when a defect occurs in the battery pack.

Further, a part or the whole of the above modified example may be appropriately combined and executed. The embodiments disclosed in the present disclosure should be considered as illustrative in all points, and not be considered as limited. The scope of the present disclosure is shown by the claims, not by the above description, and is intended to include meanings equivalent to the claims and all modifications within the scope thereof.

What is claimed is:

1. A vehicle comprising:
   a battery pack including a secondary battery, a first battery sensor configured to detect a state of the secondary battery, a first electronic control device, and a system main relay;
   a second electronic control device including a storage device that stores prescribed information acquired from the battery pack; and
   a third electronic control device provided separately from the battery pack and the second electronic control device, and programmed to control any one of battery power and battery current of the secondary battery as a control target, wherein
   the second electronic control device is installed at a position outside the battery pack,
   the second electronic control device is programmed to relay communication between the first electronic control device and the third electronic control device, and
   the first electronic control device controls the system main relay according to an instruction from the third electronic control device.

2. The vehicle according to claim 1, wherein the second electronic control device is installed at a position above the battery pack in the vehicle such that the second electronic control device is not influenced by heat generated in the battery pack.

3. The vehicle according to claim 1, wherein
   the battery pack is installed outside a cabin of the vehicle, and
   the second electronic control device is installed inside the cabin of the vehicle.

4. The vehicle according to claim 1, wherein the second electronic control device is installed in a state of being covered with a thermal insulation material.

5. The vehicle according to claim 1, wherein the second electronic control device is programmed to store, in the storage device, history information on information exchanged between the first electronic control device and the third electronic control device.

6. The vehicle according to claim 5, wherein the second electronic control device is programmed to store, in the storage device, the history information in a latest predetermined period.

7. The vehicle according to claim 1, wherein
the first electronic control device is programmed to calculate a first limit value for the other one of the battery power and the battery current, using a detection value of the first battery sensor,
the second electronic control device is c programmed to convert the first limit value calculated by the first electronic control device into a second limit value corresponding to the control target, and
the third electronic control device is programmed to control the control target, using the second limit value.

* * * * *